(12) United States Patent
Qu

(10) Patent No.: US 9,626,690 B2
(45) Date of Patent: Apr. 18, 2017

(54) SYSTEM AND METHOD FOR USING DATA TAGS TO MANAGE TASKS AND REWARDS IN PROVIDING OBJECT-TO-OBJECT SERVICES

(71) Applicant: Lidong Qu, Beijing (CN)

(72) Inventor: Lidong Qu, Beijing (CN)

(73) Assignee: Lidong Qu, Beijing (CN)

( * ) Notice: Subject to any disclaimer, the term of this patent is extended or adjusted under 35 U.S.C. 154(b) by 161 days.

(21) Appl. No.: 14/691,918

(22) Filed: Apr. 21, 2015

(65) Prior Publication Data

US 2015/0227959 A1     Aug. 13, 2015

Related U.S. Application Data

(63) Continuation-in-part of application No. 14/552,713, filed on Nov. 25, 2014, and a continuation-in-part of application No. 14/461,408, filed on Aug. 17, 2014, and a continuation-in-part of application No. 14/374,997, filed as application No. PCT/CN2014/082553 on Jul. 18, 2014.

(30) Foreign Application Priority Data

Sep. 18, 2013  (CN) .......................... 2013 1 0430210

(51) Int. Cl.
*G06Q 30/02*   (2012.01)
*G06F 9/46*    (2006.01)
*G06Q 20/32*   (2012.01)
*G06Q 30/00*   (2012.01)

(52) U.S. Cl.
CPC .......... *G06Q 30/0239* (2013.01); *G06F 9/46* (2013.01); *G06Q 20/3276* (2013.01); *G06Q 30/00* (2013.01)

(58) Field of Classification Search
CPC .............. G06Q 30/0239; G06Q 30/00; G06Q 20/3276; H04L 43/04; G06F 9/46
See application file for complete search history.

(56) References Cited

U.S. PATENT DOCUMENTS

| | | | | |
|---|---|---|---|---|
| 2002/0198788 A1* | 12/2002 | Moskowitz | ........ | G06Q 30/0601 705/26.1 |
| 2014/0091001 A1* | 4/2014 | Chan | ...................... | B42D 15/00 206/459.5 |
| 2014/0319209 A1* | 10/2014 | Beadles | ............. | G06Q 30/0207 235/375 |

* cited by examiner

Primary Examiner — Kim T Nguyen
(74) Attorney, Agent, or Firm — SV Patent Service

(57) ABSTRACT

The present invention relates to a method and system that use data tags to track tasks in applications to provide Object-to-Object (OTO) services. A first application data tag is issued by a data tag server as in an OTO service platform in response to an initiation of a first application by a first initiator. The first data tag specifies at least one first task for fulfilling a first service. The first application data tag is scanned by a first user terminal by a first participant. A first action data tag is issued by the data tag server. A first dynamically variable task data tag is issued by the data tag server to track the first task in the first action. The first dynamically variable task data tag is updated to record the completion of the first task in the first action when the first task is completed.

13 Claims, 10 Drawing Sheets

SYSTEM AND METHOD FOR USING DATA TAGS TO MANAGE TASKS AND REWARDS IN PROVIDING OBJECT-TO-OBJECT SERVICES

BACKGROUND OF THE INVENTION

The present application relates to the field of computer application technologies, especially the field of data coding and data tagging.

Two-dimensional (2D) codes (also referred as two-dimensional barcodes, data matrix codes or QR codes) have large information capacity, high security, high rate of data retrieval, and error correction ability. After they were invented, 2D codes have been widely applied to logistics and operations management, and identification card management.

With increased popularity of smart phones, 2D codes can be captured and uploaded onto real-time Internet by smart phones in real time and used cross-media channels, which enable them to find wide applications in Object-to-Object (OTO) fields, such as information acquisition, mobile shopping, commodity counterfeiting, identity authentication, coupon distribution, and so on.

Current mobile OTO applications of 2D codes focus on providing convenience in e-commerce; it still lacks in-depth applications.

On challenge to conventional 2D codes is that the servers that issue the 2D codes are responsible for the whole application process after the 2D codes are issued. For complex business applications, issuing 2D codes with comprehensive functions and integration of various stages of 2D code application require a lot of human and financial investments, which poses a barrier to 2D codes' application in large and complete business models. There is therefore a need to simplify the processes, in order for 2D codes to be effectively used in a wider range of and especially large-scale business applications. Moreover, there is also a need for better user experiences in 2D code applications.

SUMMARY OF THE INVENTION

The present application discloses systems and methods intended to overcome the above mentioned disadvantages in the conventional systems. The disclosed data tagging methods and systems are simplified and easier to use comparing to conventional technologies. In particular, the disclosed data tagging methods and systems can enable complex and large scale applications. The disclosed data tagging methods and systems also provide better user experiences and low-cost data tagging methods and systems.

In one aspect, the disclosed system and method use task data tags to track and manage tasks in applications and activities. The data tags include data fields that reflect the status and milestones of each activity. The data tags are functions of time which depend on the fulfillment status of the tasks in an activity. The task data tags are dynamically updated as different tasks are fulfilled.

In another aspect, the disclosed system and method provide task data tags that can be extended and combined to expand applications to include additional tasks, functions, and services. Simple tasks and activities can thus be used as building blocks for large scale, complex commercial applications. The relationships between tasks are logically defined and tracked by task IDs for the data tags.

Importantly, the disclosed data tag systems and methods not only enable complex applications to be easily developed based on existing applications, but also encourage different parties to collaborate to general new opportunities for the business and new services for customers, which results in a much healthy digitally enabled business ecosystem.

In one general aspect, the present invention relates to a computer-network based method for providing and rewarding object-to-object (OTO) services, comprising: encoding definition of a product or a service and reward rules in an original reward data tag by an encoder in a network-based OTO service system; distributing the original reward data tag to one or more reward guests in a communication network by a data tag server in the network-based OTO service system, wherein the original reward data tag is scanned by a first scanning device operated by a reward guest; in response to scanning of the original reward data tag by the first scanning device, registering the reward guest by the network-based OTO service system; distributing a secondary reward data tag to a second scanning device operated by a user to allow the reward data tag to be scanned by the second scanning device, wherein the secondary reward data tag includes at least the content in the original reward data tag; in response to scanning of the secondary reward data tag by the second scanning device, enabling the user to conduct an order of a product or a service by the network-based OTO service system; and distributing rewards associated with the order to the reward host, the reward guest, and a fulfiller(s) based on the reward rule encoded in the original reward data tag.

Implementations of the system may include one or more of the following. The computer-network based method can further include encoding, in the secondary reward data tag, definition of the product or the service and reward rules, and information about the reward guest. The step of distributing a secondary reward data tag to a second scanning device can be in response to the reward guest. The secondary reward data tag can be distributed to the second scanning device by the data tag server in response to the reward guest. The secondary reward data tag can be distributed from the first scanning device to the second scanning device in response to the reward guest. The computer-network based method can further include managing the order by a task server in the network-based OTO service system based on the of the product or service encoded in the original reward data tag; and fulfilling the product or service by one or more target servers in communication with the task server based on the product or service encoded in the original reward data tag. The original reward data tag stores information about the one or more target servers. The information about the one or more target servers comprises application programming interface (API), parameters, and protocol associated with the one or more target servers. The computer-network based method can further include allowing the product or the service and reward rules in the original reward data tag to be decoded and extracted by the first scanning device; and receiving a confirmation of agreement to the reward rules from the first scanning device by the data tag server before the step of registering. The computer-network based method can further include storing information about the reward guest in a database or a storage in the network-based OTO service system. The step of registering the reward guest comprises registering the reward guest as a potential contributor to distribute the reward data tag to users. The reward data tag comprises a one-dimensional code, a two-dimensional code, a two-dimensional barcode, a data matrix code, a QR code, or a three-dimensional code. The reward data tag is in a form of electronic media or printed media.

In another general aspect, the present invention relates to a computer network system for using data tags to track, manage, and update applications and tasks to provide Object-to-Object (OTO) services, comprising: one or more data tag servers in an OTO service platform configured to receive an initiation of a first application by a first initiator, wherein the one or more data tag servers are configured to issue a first application data tag that specifies at least one first task for fulfilling a first service in the first application, wherein the one or more data tag servers are configured to issue a first action data tag when the first application data tag is scanned by a first user terminal operated by a first participant, wherein the one or more data tag servers are configured to issue a first dynamically variable task data tag to track the first task in the first action, wherein the one or more data tag servers are configured to update the first dynamically variable task data tag to record completion of the first task in response to completion of the first task in the first action.

Implementations of the system may include one or more of the following. The one or more data tag servers can receive information of a recipient of the first service from the first user terminal and to embed the information about the recipient in the first action data tag. The one or more data tag servers can embed the identification of the first participant in the first action data tag. The first application data tag can store functions or information about target servers for fulfilling the first service. The information about the target servers can include application programming interface (API), parameters, and protocol associated with the target servers. The computer network system can further include a data base in communication with the one or more data tag servers and configured to store information about the first application including at least the first initiator, the first task, and the first service. The computer network system can further include an OTO access-point router in communication with the one or more data tag servers and the first user terminal, configured to store information about the first application including at least the first initiator, the first task, and the first service. The one or more data tag servers can issue a second action data tag when the first application data tag is scanned by a second user terminal operated by a second participant, wherein the one or more data tag servers can issue a second dynamically variable task data tag to track the first task in the second action, wherein the one or more data tag servers can update the second dynamically variable task data tag to record completion of the first task in response to completion of the first task in the second action. The one or more data tag servers can receive an initiation of a second application by a second initiator and to issue a second application data tag that specifies at least one first task for fulfilling a second service in the second application, wherein the one or more data tag servers can issue a third action data tag when the first application data tag and the second application data tag are scanned by a third user terminal operated by a third participant, wherein the one or more data tag servers can issue dynamically variable task data tags to track the tasks in the third action, wherein the one or more data tag servers are configured to update the third dynamically variable task data tags to record completion of the third tasks in response to completion of the third tasks in the third action. The one or more data tag servers can receive an initiation of a second application by a second initiator and to issue a second application data tag that specifies at least one first task for fulfilling a second service in the second application, wherein the one or more data tag servers can initiate a third application when the first application data tag and the second application data tag are scanned by a fourth user terminal operated by a third participant, wherein the one or more data tag servers can receive a request from the third participant to add a third service in the third application, wherein the one or more data tag servers can issue a fourth action data tag that specifies tasks to fulfill the first service, the second service, and the third service in the third application. The one or more data tag servers can issue dynamically variable task data tags to track the tasks in a fourth action, wherein the one or more data tag servers are configured to update the dynamically variable task data tags to record completion of the tasks in response to completion of the tasks in the fourth action. The first application data tag, the first action data tag, or the first dynamically variable task data can be printed on a physical tag. The first application data tag, the first action data tag, or the first dynamically variable task data can be displayed in an electronic device. The first application data tag, the first action data tag, or the first dynamically variable task data can include a one-dimensional code, a two-dimensional code, a two-dimensional barcode, a data matrix code, a QR code, or a three-dimensional code. The first application data tag can be decoded to extract the at least one first task for fulfilling the first service.

In another general aspect, the present invention relates to a computer-implemented method for providing services using data tags. The method includes in response to an initiation of a first application by a first initiator, issuing a first application data tag by one or more data tag servers in an OTO service platform, wherein the first data tag specifies at least one first task for fulfilling a first service in the first application; allowing the first application data tag to be scanned by a first user terminal by a first participant; responsive to scanning of the first application data tag by the first user terminal, issuing a first action data tag by the one or more data tag servers; issuing a first dynamically variable task data tag by the one or more data tag servers to track the first task in the first action; and in response to completion of the first task in the first action, updating the first dynamically variable task data tag to record the completion of the first task.

Implementations of the system may include one or more of the following. The computer-implemented method can further include receiving information of a recipient of the first service from the first user terminal; and embedding the information about the recipient in the first action data tag. The computer-implemented method can further include embedding the identification of the first participant in the first action data tag. The first application data tag can store functions or information about target servers for fulfilling the first service. The information about the target servers can include application programming interface (API), parameters, and protocol associated with the target servers. The computer-implemented method can further include allowing the first application data tag to be scanned by a second user terminal operated by a second participant; responsive to scanning of the first application data tag by the second user terminal, issuing a second action data tag by the one or more data tag servers; issuing a second dynamically variable task data tag by the one or more data tag servers to track the first task in the second action; and in response to completion of the first task in the second action, updating the second dynamically variable task data tag to record the completion of the first task. The computer-implemented method can further include: responsive to initiation of a second application by a second initiator, issuing a second application data tag by the OTO service platform, wherein the second application data tag specifies at least one second task for fulfilling a second service; allowing the first application data tag and the second application data tag to be scanned by a third user terminal operated by a third participant; responsive to the third user terminal and the third participant, issuing a third action data tag by the one or more data tag servers; issuing dynamically variable task data tags by the one or more data tag servers to track the first task and the second task in the third action; and in response to completion of the first task and the second task in the third action, updating the dynamically variable task data tags to record the completion of the first task and the second task. The computer-implemented method can further include responsive to initiation of a second application by a second initiator, issuing a second application data tag by the OTO service platform, wherein the second application data tag specifies at least one second task for fulfilling a second service; allowing the first application data tag and the second application data tag to be scanned by a third user terminal operated by a third participant; allowing the third participant to add a third service to initiate a third application; and responsive to the third user terminal and the third participant, issuing a third application data tag by the one or more data tag servers, wherein the third application data tag specifies tasks to fulfill the first service, the second service and the third service. The computer-implemented method can further include: responsive to scanning of the third application data tag by a fourth user terminal, issuing a fourth action data tag by the one or more data tag servers to initiate a fourth action; issuing dynamically variable task data tags to track the tasks in the fourth action; and in response to completion of the tasks in the third action, updating respective dynamically variable task data tags to record the completion of the tasks in the fourth action. The first application data tag, the first action data tag, or the first dynamically variable task data can be printed on a physical tag. The first application data tag, the first action data tag, or the first dynamically variable task data can be displayed in an electronic device. The first application data tag, the first action data tag, or the first dynamically variable task data can include a one-dimensional code, a two-dimensional code, a two-dimensional barcode, a data matrix code, a QR code, or a three-dimensional code. The computer-implemented method can further include decoding the first application data tag to extract the at least one first task for fulfilling the first service.

The disclosed data tagging methods can include one or more of the following steps:

(1) A user terminal acquires tag data, and parses the tag data to obtain a set of information about the services and functions related to a business application. The service information and function information correspond to respective target servers;

(2) The user terminal and the target servers exchange information about the services and functions in order to accomplish the services and functions, and fulfill the business application.

Step (1) in the disclosed method can include the following steps:

(a) The user terminal acquires tagging data from a data tag server, parses the tag data, and obtains corresponding information about the business application in the tag data;

(b) Based on the information about the business application, the user terminal obtains the set of service and function information and information about target servers related to the services and the functions.

The service and function information can include service Software Development Kits (SDK) and function SDKs respectively corresponding to the services or functions. The service SDK and the function SDK respectively include information about their respective target servers, comprising application programming interface (API), parameters, and protocol associated with the target servers.

Step (2) in the disclosed method can include one or more of the following steps:

(a) based user operations, the user terminal selects some or all in the set of service and function information;

(b) The user terminal interacts with each target server to exchange the selected service and function information, to accomplish appropriate services and functions, and to complete the business application.

In the disclosed method, the step of user terminal interacting with each target server to exchange the selected service and function information includes the following steps:

The user terminal determines whether the selected service and function information will be exchanged with the target servers in sequential or in parallel order;

The user terminal exchanges the selected service and function information with the target servers in sequence or in sequential or in parallel order.

The present disclosure also provides a data tagging system comprising a user terminal, which can include a tag data acquisition module, a tag data analysis module, and an interaction control module. The tag data acquisition module is configured to acquire data from data tags and store the data. The tag data analysis module parses the tag data to obtain a set of data corresponding to services and functions for business applications. The interaction control module exchanges service and function information with corresponding target servers, to accomplish appropriate services and/or functions, and to complete the business application.

The disclosed data tagging system also includes a data tag server that is configured to provide, to the user terminal, tag data according to the services as well as service and function information, corresponding to respective target servers.

In the disclosed data tagging system, the data tag server can store a list of application services and corresponding service and function information, and information about target servers associated with the service and function information. The target server information includes API, parameters, and protocol about the associated target server.

In the disclosed data tagging system, the user terminal can be a wired or a wireless terminal, wherein the data tag server is connected to the user terminal through a computer network.

In the disclosed data tagging system, the user terminal further includes a selection control module operated by a user and configured to select some or all in the set of the service and function information.

In the disclosed data tagging system, the user terminal further includes a sequence control module configured to determine the order (i.e. sequential parallel) of the selected service and function information to exchange with target servers.

In the disclosed data tagging method and system, the tag data acquisition module in the user terminal obtains tag data; the tag data analysis module parses the tag data to obtain a set of data corresponding to services and functions for business applications; the interaction control module exchanges service and function information with corresponding target servers, to accomplish appropriate services and/or functions, and to complete the business application.

The disclosed data tagging method and system enables the user terminal to directly interact with target servers to accomplish the business application defined by the service and function information, which allows the tasks in complex business applications to be accomplished by distributed servers, and eliminates the need for building application servers in a network system. The disclosed data tagging method and system can thus reduce the cost for application service providers to building dedicated application servers, allow the data tags to be used more broadly, and provide better user experiences and low-cost data tagging methods and system.

These and other aspects, their implementations and other features are described in detail in the drawings, the description and the claims.

DETAILED DESCRIPTION OF THE INVENTION

The disclosed invention can be more clearly understood with the following detailed descriptions of the exemplified embodiments.

Figure 1:
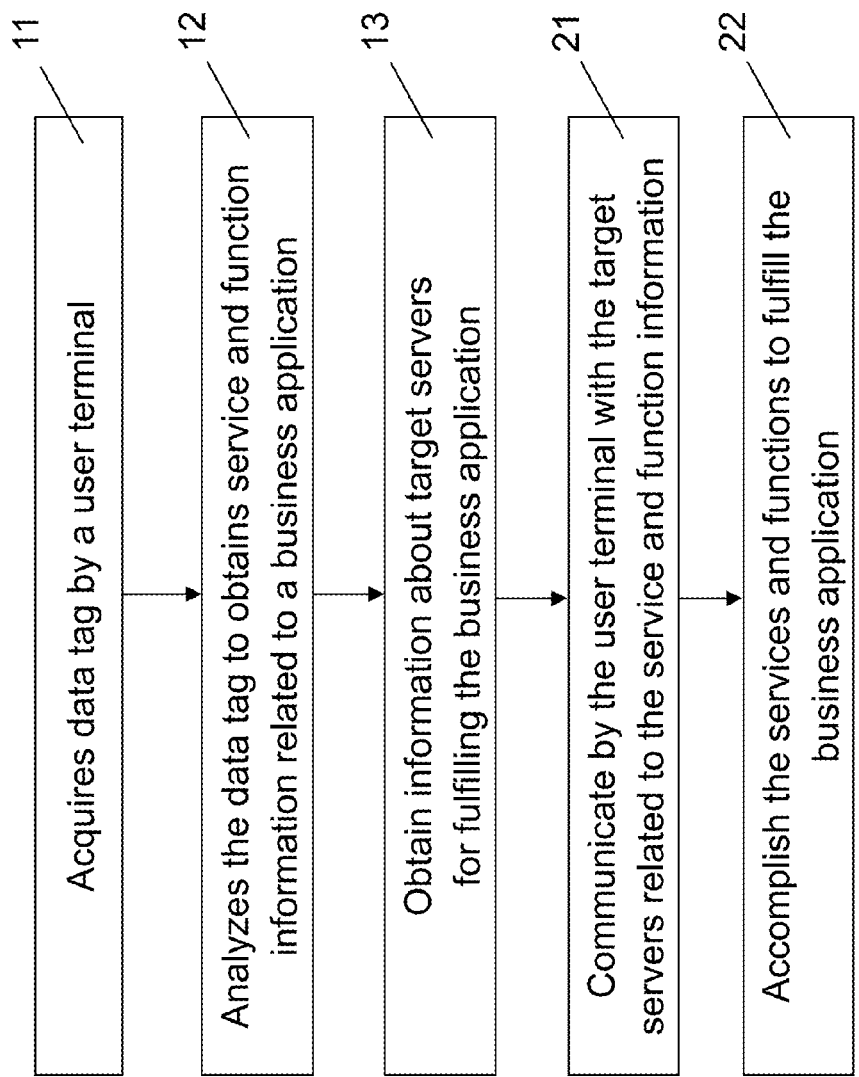
FIG. 1 is a data tagging flow diagram in accordance with some embodiments of the present invention.

A data tagging flow diagram in accordance with disclosed method is shown in FIG. 1.

In some embodiments, referring to FIG. 1, the disclosed data tagging method can include the following steps:

Step 1: the user terminal acquires data from data tag (step 11) which can be one-dimensional barcode, two-dimensional or three-dimensional code. The data tag can also include a RFID tag, and near field communication (NFC) data. The user terminal analyzes the data tag to obtain a set of service and function information related to a business application (step 12). The service and function information are corresponding to respective target servers (step 13). Examples of target servers include data tag server configured to generate data tags that define services, functions, and target servers that implement the services and the functions, analysis server configured to extract service and function information from tag data, selection servers configured to allow user to select a service, location server configured to determine a user's location, authentication server configured to authenticate user's identification, and purchase server configured to process a user's order.

Step 2: the user terminal exchanges the service and function information with the target servers (step 21) in order to accomplish the services and functions, and fulfill the business application (step 22).

Step 1 in the disclosed method can include the following detailed steps:

(a) The user terminal acquires tagging data from a data tag server, parses the tag data, and obtains corresponding business application information in the tag data;

(b) Based on the business application information, the user terminal obtains a set of service and functions information, and information about target servers related to the services and functions. Service information and function information can include product information, location information, logistics, shopping mode selection, and order and payment information.

In some embodiments, the service and function information can include service Software Development Kits (SDK) and function SDKs corresponding to the services or functions. The service SDK and the function SDK respectively include information about their respective target servers, comprising application programming interface (API), parameters, and protocol associated with the target servers.

Step 2 can include one or more of the following detailed steps:

(a) Based user operations, the user terminal selects some or all in the set of the service and function information;

(b) The user terminal interacts with each target server to exchange the selected service and function information, to accomplish appropriate services and functions, and to complete the business application.

In some embodiments, the step of user terminal interacting with each target server to exchange the selected service and function information includes the following steps:

The user terminal determines whether the selected service and function information will be exchanged with the target servers in sequential or in parallel order;

The user terminal exchanges the selected service and function information with the target servers in sequence or in sequential or in parallel order.

Figure 2:
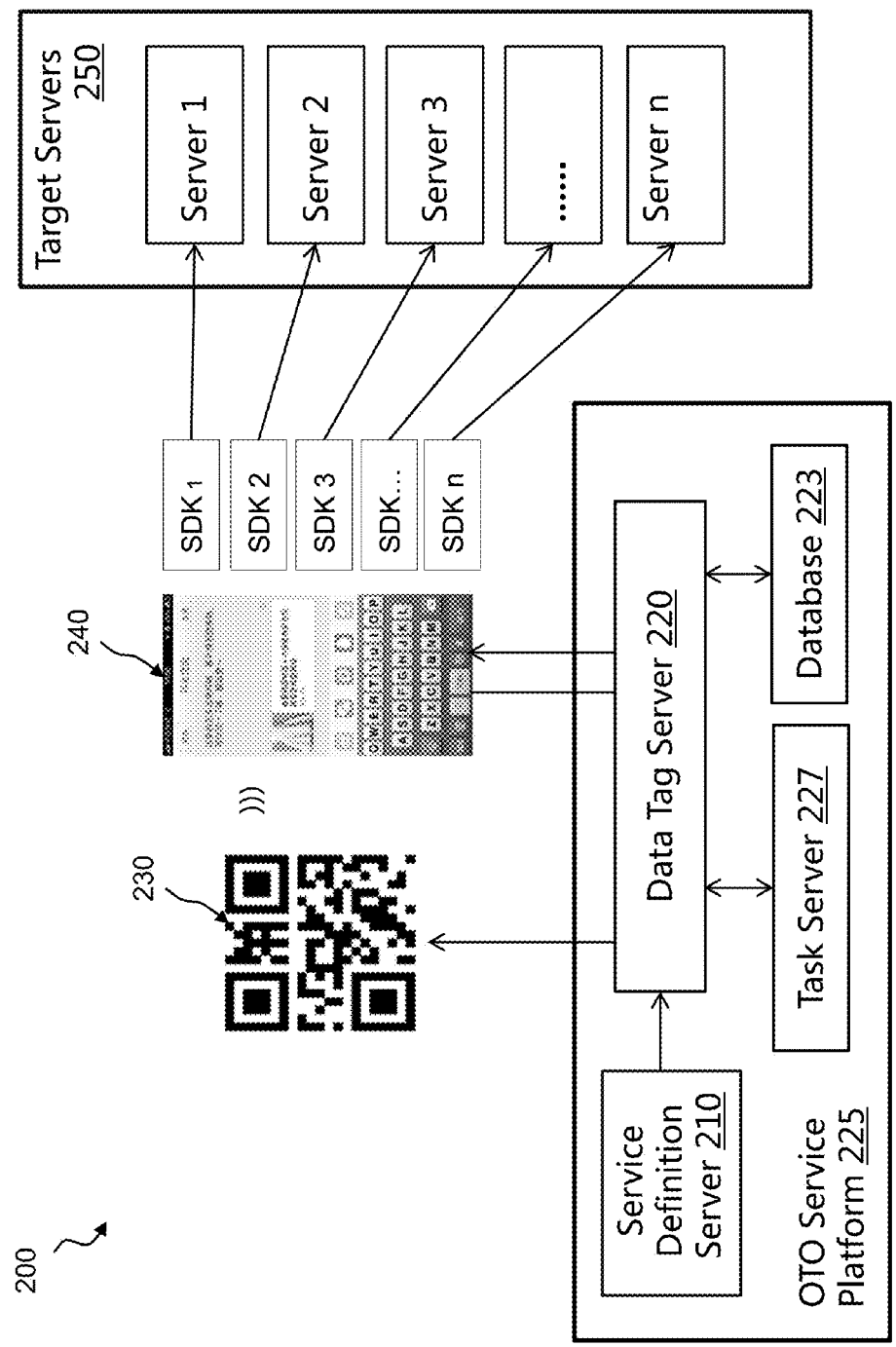
FIG. 2 is a schematic diagram of a computer network system for providing services using data tags in accordance with some embodiments of the present invention.

As shown in the above examples and illustrated in FIG. 2, a computer network system 200 for providing services using data tags includes a service definition server 210, one or more data-tag servers 220 for generating and issuing data tag (e.g. 2D code) and for analyzing data obtained from data tags, data tags 230 published on electronic media or printed on paper media, a smart user terminal 240 (e.g. a smart phone) installed with a software application configured to capture an image of the data tag and decode the data tag, which is subsequently analyzed by the data-tag server 220, and one or more target servers 250 that provide services for business applications.

The computer network system 200 includes an OTO service platform 225 provided by the OTO application service provider, which can include the data tag server 220, a database 223, and a task server 227. As discussed in more detail below, the task server 227 manages and tracks tasks according to a timelines for each unique action or activity between an initiator and a participant. The database 223 stores characteristics for each application (SDK, target servers, service and function, etc.), product IDs, information about third party service providers, and identification and other information about OTO access-point router. The database 223 also stores identifications of initiators, participants, and service recipients, and status for each unique activity based on an application.

The user terminal 240 can include a smart phone or a tablet computer equipped with a camera, handheld scanner, and RFID sensing device. The user terminal 240 can include a tag data acquisition module, a tag data analysis module, and an interaction control module. The tag data acquisition module is configured to acquire data from data tags and store the data. The tag data analysis module parses the tag data to obtain a set of data corresponding to services and functions for a business application. The interaction control module exchanges service and function information with corresponding target servers 250, to accomplish appropriate services and/or functions, and to complete the business application.

The data-tag server 220 is configured to provide, to the user terminal 240, tag data according to the services as well as service and function information, corresponding to respective target servers 250. In some embodiments, at least part of data tag decoding tasks is conducted by the data-tag server 220. The user terminal 240 can be a wired or a wireless terminal, wherein the data-tag server 220 communicates with the user terminal 240 through a computer network.

In the disclosed data tagging system, the data-tag server 220 that issues data tag can store a list of application services and corresponding service and function information, and information about target servers 250 associated with the service and function information. The target server information includes API, parameters, and protocol about the associated target servers 250.

Still referring to FIG. 2, service information and function information can include product information, location information, logistics information, shopping mode selection, and order and payment information. In some embodiments, the service and function information include SDK 1, SDK 2 . . . , SDK n, which can include service Software SDKs and function SDKs corresponding to the services or functions. The service SDK and the function SDK respectively specify information about their respective target servers 250, such as application programming interface (API), parameters, and protocol associated with the target servers 250.

In some embodiments, the user terminal 240 further includes a selection control module operated by a user and configured to select some or all in the set of the service and function information.

In some embodiments, the user terminal 240 further includes a sequence control module configured to determine the order (i.e. sequential parallel) of the selected service and function information to exchange with target servers.

By realizing OTO service definitions, integration, and collaboration, the disclosed system and methods transformed how services are organized and provided, can achieve real-time services by collaboration across organizations, and enable flexible combination of services, refinement of service units, and automated service coordination.

Figure 3:
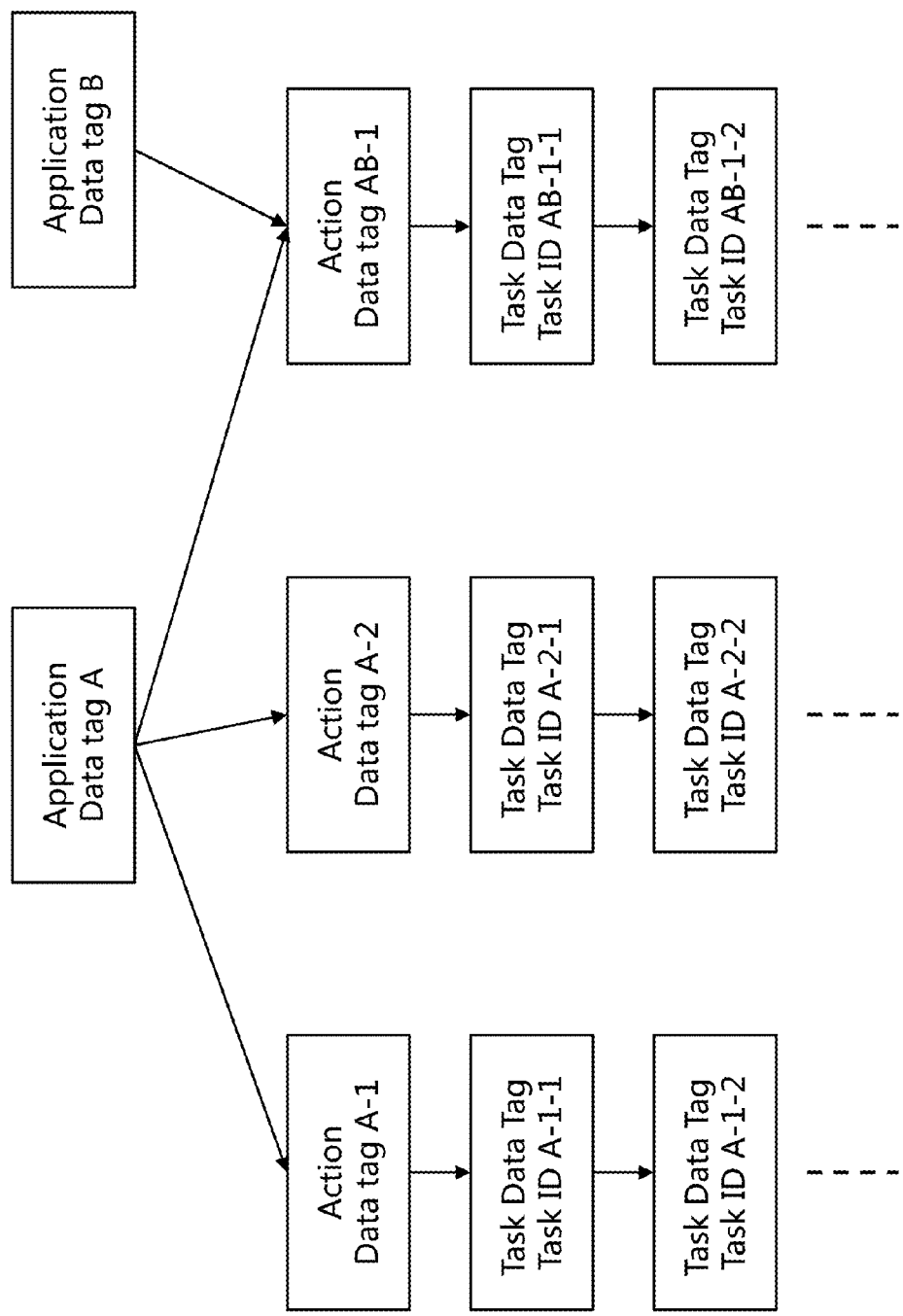
FIG. 3 is a flowchart for using data tags to track and manage tasks in an action based on an application.

Referring to FIG. 3, an initiator can initiate a new application A, and in response, the data tag server 220 issues an application data tag. The application can be business in nature, but also be used for social, charity, and governmental projects. The OTO platform issues an application ID at the same time for tracking the course of the application. The specification and ID of the application A are stored in the database 223. A first participant scans the data application tag using his or her smart device (i.e. a user terminal), acquires information embedded in the application data tag with the help of the OTO service platform 225, and sends a request to the OTO service platform 225. The initiation-response cycle starts and defines a unique action (or activity). The task server 227 assigns an action ID A-1 and the data tag server 220 issues an action data tag A-1 to the new action. The action data tag A-1 not only stores information about application A (with more details described below) but also user information about the specific participant who started action A-1 as well as that participant's specific parameters selected or entered for application A (i.e. which defines action A-1). Each action can include multiple tasks for fulfilling a service. Each task in action A-1 is tracked and managed by a task data tag issued by the data tag server 220 and with a task ID A-1-1 or A-1-2 . . . assigned by the task server 227. The OTO service platform tracks the tasks in action A-1, and updates the task data tag over the course of action A-1 until the action A-1 is completed (i.e. the service in the action is fulfilled). At its completion, the OTO service platform 225 issues a new task data tag to capture the completed action A-1.

As an example, application A can be designed to sell a product. An action A-1 started by a participant based on application A can involve tasks such as "Check the product", "Order", "Payment", and "Share with friends", which are defined in the original application A and stored in or can be accessed using information in action data tag A. These tasks can be managed using task data tags A-1-1, A-1-2, A-1-3, and A-1-4 issued by the data tag server 220 and with IDs assigned by the task server 227. If a participant checks the product, then orders, and then pays for the product, three tasks are accomplished in action A-1 and their corresponding task data tags A-1-1, A-1-2, A-1-3 are updated by the OTO service platform 225. If she shares Action A-1 with a friend, another task A-1-4 is created with a new task data tag A-1-4 is issued by the OTO service platform 225. The task data tag A-1-4 can be scanned by her friend's device or other people's devices to use the service of application A.

Similarly, other participants can scan the application data tag A to start other actions A-2, A-3, etc. Each of the actions is tracked and managed by action data tag A-2, A-3, etc., which are issued by the data tag server 220. The action IDs A-2, A-3, etc. are assigned by the task server 227. Each of the actions based on the same application A is uniquely associated each initiator-response cycle and the particular participant.

The data tags A, A-1, A-1-1, or A, A-2, A-2-1 are associated with the each other in a task family. The definitions and characteristics in the application data tag A can be copied into the action data tag A-1. As described, action data tag A-1 also includes the user identification information for the participant who initiated the action as well additional parameters the participant selected for the services defined in application A. In some embodiments, application ID A is copied in the action data tag A-1 instead of the content in the application data tag A. Application ID A can serve as a link or pointer at the OTO service platform for action data tag A to retrieve information about application A. Thus action data tag A can simply include the ID for application A and additional content.

Similarly, task data tags A-1-1, A-1-2 can copy content or identification from the action A-1 or the root application A, plus additional information about the tasks. The identifications of action A-1 or application A can serve as links to pointers to be used by the OTO service platform to retrieve relevant information. Using the action task ID A, task data tags A-1-1, A-1-2 can simply call the OTO service platform 225 to perform tasks or services related to action A-1, which can save embedding too much data in the s task data tags A-1-1, A-1-2. Information related to application A such as user interface (UI) and service interface (SI) can be retrieved from the OTO service platform 225 for performing tasks A-1-1, A-1-2 in action A-1.

Thus task IDs A, A-1, A-1-1, A-2, A-2-1 have very flexible nested structure. Each task ID is unique; it properly reflects relationships between application, action, and tasks and can be used to track and manage tasks for fulfilling actions based on applications.

In some embodiments, a new action can be built upon two different applications. Still referring to FIG. 3, an application B is initiated by an initiator at the OTO service platform 225. The OTO service platform issues an application data tag B. The OTO service platform 225 enables a participant to use his or her smart device to scan the application data tag A and the application data tag B, and create a new application based on both application A and application B. The participant acquires information about the two original applications and initiates additional action AB-1 based on both applications A and B. The OTO service platform 225 issues a new action data tag AB-1, and subsequently assigns task ID AB-1-1, AB-1-1 . . . to track and manage tasks in the action AB-1. The services, functions, tasks, and other characteristics in application data tag A and B can be copied or simply lined via application ID's A and B into the action data tag with task ID AB-1.

In some embodiments, an action or task data tag can include a plurality of application IDs that can define parallel tasks or cascaded tasks from parent applications. An action or a task data tag can thus be linked to a plurality of applications by simple identifications of established applications. Thus extremely complex tasks and services can be represented, managed, and tracked in an elegant and simple manner, which makes the fulfillment of services much more effective. Furthermore, commercial applications can be easily expanded by building on utilizing already defined applications and their already developed task ID and associated infrastructure defined in the IDs. Moreover, collaborations between different parties are encouraged to achieve synergies and efficiencies for the economy and society. The accurate recording of tasks in task data tags allow accurate computation of contributions made by different parties in fulfilling services in an application.

Figure 4:
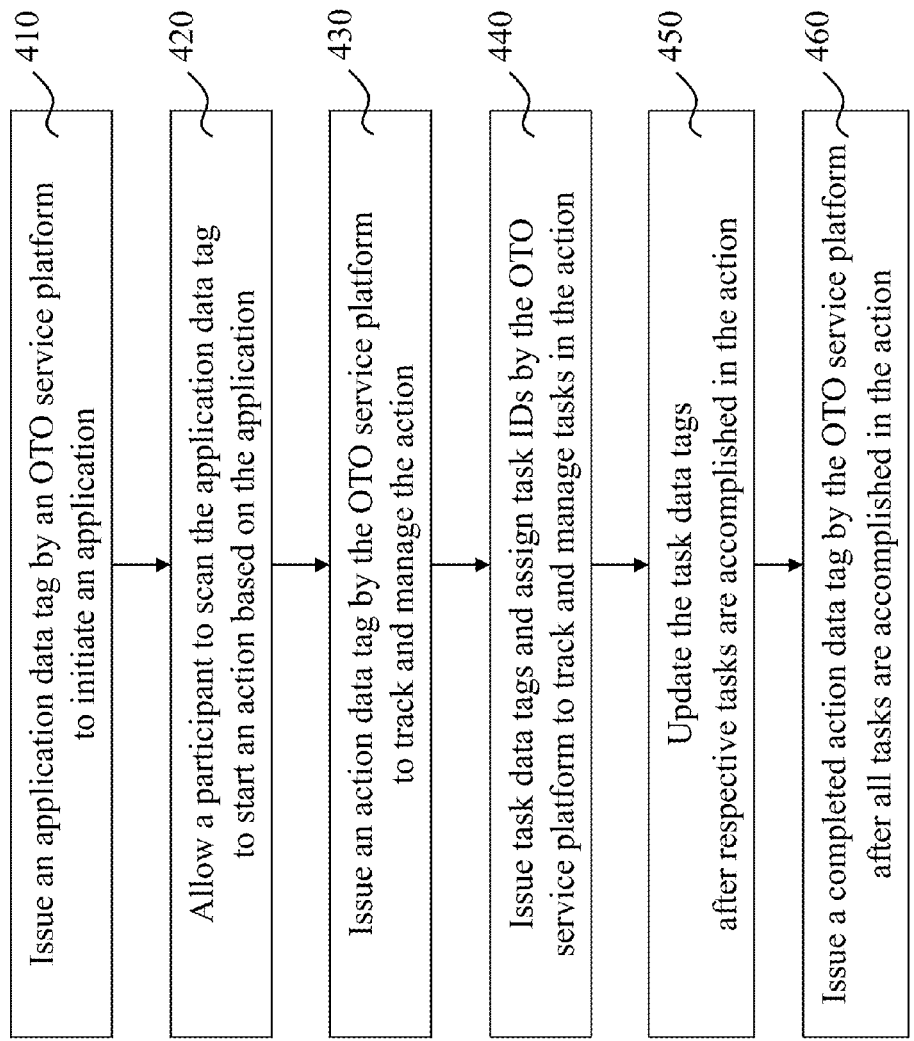
FIG. 4 illustrates managing complex applications and actions using nested task data tags.

The disclosed method of using data tags to track and manage applications, actions, and tasks can include one or more of the following steps. Referring to FIG. 4, an initiator sends a request to an OTO service platform to initiate an application which provides one or more services by performing a number of tasks in certain sequence using a number of functions and resources (e.g. target and application servers). The initiator specifies SDK, applications, and target servers for fulfilling the service(s) on the OTO service platform. The data tag server in the OTO service platform issues an application data tag to initiate the application (step 410). The application data tag can store SDK, applications, and functions and information about the target servers for fulfilling the service(s). The information about the target servers comprises application programming interface (API), parameters, and protocol associated with the target servers.

The characteristics in the application data tag are stored in the data base in the OTO service platform. At this point, the application data tag is not effective yet because there may or may not be users interested in using the application. The values for status for the tasks are set to zero. The application data tag also includes data fields for storing information about a participant (or the person who orders the service) and a recipient of the first service. Before the application is activated and becomes effective, the recipient data field is set as blank or zero. The data tag can be printed in a physical data tag, or displayed in an electronic device.

The OTO service platform tracks and records the status of the activity and updates the task data tag throughout the fulfilling process until the task is completed.

If a participant is interested in using the application, he or she scans the application data tag with his or her device (i.e. user terminal), and decodes the application data tag to acquire information about the application and responds to the OTO service platform (step 420). The information acquired can include SDK, the information about target server(s), and related user identification. The participant sends a request to the OTO service platform to initiate a new action based on the application (step 420). In the request, the participant specifies a recipient for the service and parameters that he or she wants for this action (e.g. product or service types, quantity, quality level, delivery time).

The OTO service platform receives the request from the participant and issues action data tag to track and manage the action based on the application (step 430). The action data tag is embedded with information that identifies the service orderer (i.e. the participant) and the recipient of the service, and tasks to be performed by incorporating or linking to the content from the application data tag and information stored at the OTO service platform. The task server in the OTO service platform assigns a unique action ID for the action initiated by the specific participant for a specific recipient. It should be noted that different action IDs are required for different actions initiated by different responses to a same application data tag.

The data tag server and the task server in the OTO service platform respectively issues task data tags and assigns task ID to the tasks in the action (step 440). As described above, the task server manages task IDs for tasks in each action based on each application supported by the OTO service platform. Task data can include characteristics such as function and service, service contract and process management, participating members, the recipient of the service, and timelines, etc. The task data is embedded in a task data tag.

As tasks defined in the task data tags are completed by the servers, applications, and SDKs define therein, the task data tags are updated by the OTO service platform (step 450). When all the tasks in an action are finished, a completed action data tag is issued by the data tag server to capture the status of the completed action (step 460).

As described above, tasks, actions, and applications are uniquely identified, tracked, and their relationships clearly defined using dynamically varying data tags. Tasks, actions, and applications can thus be much more effectively managed and the results can be quantitatively improved. The presently disclosed task data tags are dynamic and living data objects which vary as functions of timeline in the associated action. Thus, the presently disclosed data tags are very different from the static data tag objects in conventional systems.

Other details about systems, platforms, methods, and applications of the data tags are also disclosed in commonly assigned pending U.S. patent application Ser. No. 14/383,824, titled "System and method for tracking and utilizing data tag carriers", filed on Sep. 8, 2014, U.S. patent application Ser. No. 14/390,138, titled "Platform and application method for inter-system data exchange based data tags", filed on Oct. 2, 2014, and U.S. patent application Ser. No. 14/461,408, titled "Apparatus and method for data-tag based object-to-object applications", filed on Aug. 17, 2014, the disclosures of which are incorporated herein by reference.

The above discussed data tagging methods and system are further illustrated by following examples:

Example 1

Product Ordering in Response to Tag Data

During store shopping, a consumer can use a mobile phone to take picture of data tag such as a 2D code on a commodity. An application (i.e. APP) installed on the mobile phone can decode the 2D code in the captured image and obtain application service embedded in the 2D code to order the commodity. The consumer can also obtain service information and function information such as product information, location information, logistics information, shopping mode selection, and order and payment information.

Specifically, the mobile phone first uses the application to connect to the server that maintains the product information via a mobile wireless network, acquires the product information, and displays it on the mobile phone. Then a location server (an example of a target server) determines the location of the consumer, and his or her relative location to the manufacturer and the storage warehouse. Web-based product order information is provided to the consumer. A purchase-method selection server (another example of a target server) integrates product and logistic information, and provides the consumer different purchase prices for different purchase methods. After the consumer confirms a purchase method, an order server (another example of a target server) transmits the order to the store for ordering from existing stock. Alternatively, the order server can send to order directly to the manufacturer and a logistics vendor through a computer network. Finally, the consumer can complete product purchase by making payment using his or her mobile phone. It should be noted that such 2D codes can also be printed directly in advertisements on newspapers and magazines. Consumers can process the product purchase by capture the image of the 2D codes on newspapers or magazines.

Thus, the generation of a 2D code for product ordering only requires that the service and function information and information about corresponding target servers to be contained in the corresponding SDKs. The user terminal can decode the 2D code and communicate with target servers directly to fulfill orders. Thus, the tasks of an order server are decomposed, which refines the 2D code application, providing more flexible services and functions, at lower cost.

Example 2

TV Set-Top Boxes

With the increased popularity of high-definition television, TV set-top boxes become common household electronic devices and in hotels. HD programs typically require users to pay a fee. However, the right to watch HD programs is tied to a specific TV set-top box. It is difficult for a user to watch the HD programs on a different TV set-top box. Moreover, another difficulty is to allow users to watch HD TV programs for a short term in hotels and other venues.

The data tagging method and system enable a data tag such as a 2D code to be displayed on TV after the TV set-top box is turned on. A user can take a picture of the 2D code using a mobile phone. The mobile phone can decode the 2D code, extract service information for the paid TV programs, and can obtain information about authentication, permissions, payment information, and other services and features.

First, the 2D code includes information about an authentication server (another example of a target server). The user can authenticate his or her identification through authentication server, and then register or login via an authorization server. If the user has purchased the pay-TV service, the authorization server sends to right-to-use confirmation, via a computer network, to the specific TV set-top box that the user is using, which allows the user to TV programs on the specific TV connected to the TV set-top box. Thus, the right to watch pay-TV is no longer tied to a specific TV set-top box. A consumer can watch pay-TV programs on any set-top box. If the user has not purchased a pay-TV service, the user can pay for the pay-TV service using the purchase information extracted from the 2D code on his or her mobile phone. The mobile phone can communicate directly with a purchase server (another example of a target server) to complete the order. The simplified pay-TV process is very suitable for short-term user of pay-TV services, in hotels etc.

Moreover, suitable data tags can include printed data codes (1D, 2D, 3D codes) and RFID tags. Examples of 2D codes include, but not limited to, two-dimensional barcodes, data matrix codes, or QR codes, etc. The 2D codes are first captured the smart user terminal and decoded by the software application on the smart user terminal to obtain tag data. The tag data is then parsed and analyzed by the analysis server to extract service and function information from the tag data. The software application (e.g. the mobile application on the smart phone) receives the service and function information and displays them on the smart terminal, as shown in FIG. 2. On the other hand, RFID tags can store service and function. Once retrieved, the mobile application can display such information at the user terminal without involving an analysis server.

The disclosed method and system include the following features:

1. Unified encoding rules for tag data. A data tag server generates data tags according to services and functions to be provided and received, wherein the data tags can be retrieved by applications on intelligent user terminals.

2. Tag data retrieved by the intelligent terminals are defined by a combination of the data tag server and intelligent user terminals, target servers that provide services, and collaborative approach to provide services.

3. An analysis server parses the tag data retrieved by the intelligent terminal to obtain SDKs related to target servers and services, and provides the SDKs the intelligent terminal.

4. The tag data is configured to provide and/or receive all services and functions necessary for a business application. A user can choose a service or function through a software application (e.g. a mobile App) at an intelligent terminal to interact with target servers, to accomplish actions and service contracts by coordinating services and the corresponding target servers.

The disclosed method and system can include one or more of the following advantages:

1. Flexible combination of services. Services can be flexibly combined and coordinated in response to data tag scanning by a user and user defined services. Tag data include SDKs that define relationship between different target servers based on services, target servers, and service contracts. The disclosed methods also assure coordination among services and in-depth specialization and optimization of resources.

2. More user friendly experiences. The disclosed tag data improve friendliness and user operability of the user interface. A user can select appropriate services at a user interface according to the specific combination of services that is desirable to the user.

3. In-depth utilization of a portfolio of services allows separation of authentication, payment, and service fulfillment, which increases the system security.

In the disclosed data tagging methods and system, a user terminal obtains data from data tag using a tag data acquisition module, parses the tag data using a tag data analysis module to acquire corresponding business applications and associated service and function information. An interaction control module in the user terminal then interactively communicates with target servers to exchange service and function information to fulfill business application. In the disclosed data tagging methods and system, the user terminal can implement business application based on the tag data, and directly accomplish services and functions by interacting with target servers that provide such services and functions, which eliminates the need for a central application server to fulfill the services. Different in complex business applications can therefore by accomplished by distributed interactive target servers, which effectively simplifies operation of utilizing tag data, reduces the costs of building application servers by service providers. The disclosed data tagging methods and system are more convenient and of lower cost, which allow wider applications data tagging, with improved user experiences.

Figure 5:
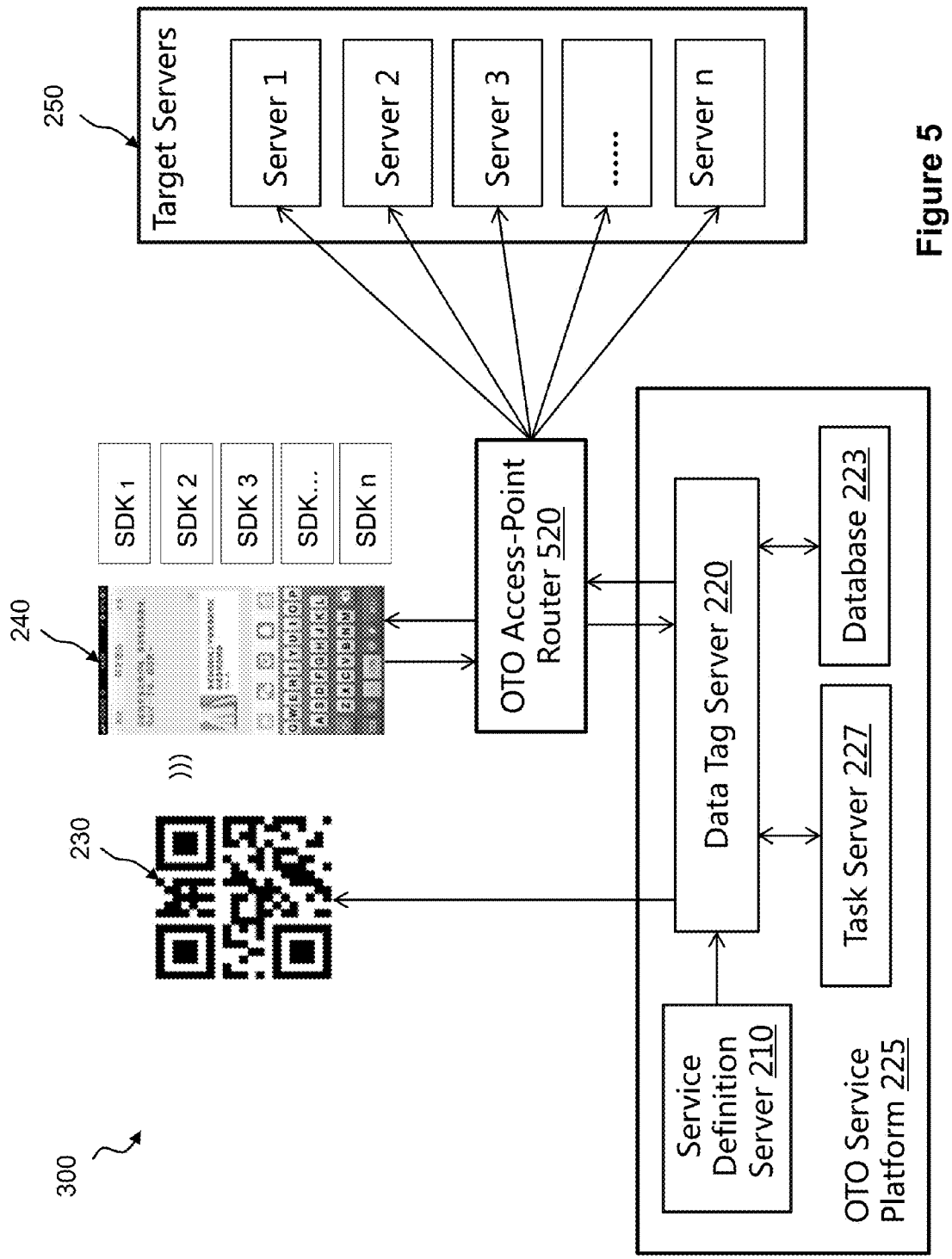
FIG. 5 is a schematic diagram of another computer network system for providing services using data tags in accordance with some embodiments of the present invention.

In some embodiments, referring to FIG. 5, a computer network system 500 for providing services using data tags includes a service definition server 210, one or more data-tag servers 220 for generating and issuing data tags (e.g. 2D code) and for analyzing data obtained from data tags, data tags 230 published on electronic media or printed on paper media, a data base 230 in connection with the one or more data tag servers 220, a smart user terminal 240 (e.g. a smart phone) installed with a software application configured to capture an image of the data tag and decode the data tag, which is subsequently analyzed by the data-tag server 220, and one or more target servers 250 that provide services for business applications.

The computer network system 500 also includes an OTO access-point router 520 that is configured to communicate with the user terminal 240, the data-tag server 220, and the one or more target servers 250. The OTO access-point router 520 can communicate with the user terminal 240 based on a wireless standard such as WiFi, WiMax, Bluetooth, IEEE 802.11, etc. As described above, the computer network system 500 includes an OTO service platform 225 provided by the OTO application service provider, which can include the data tag server 220, a database 223, and a task server 227. The OTO access-point router 520 can be provided by the same OTO application service provider, or by a third party owner that partners with the OTO application service provider in providing data tag-based OTO application services.

The target servers 250 can include remote and local severs. Local servers can be distributed at locations close to user terminals, which increase data transfer and processing speeds for initiating and executing OTO application services. The target servers 250 can also include private and public servers. The private servers can function as master servers that drive the public servers (slave). For example, for most small companies, the user terminals 240 interact directly with public target servers 250 which perform most tasks for business applications. Large companies, on the other hand, can own most of the target servers in a private platform. The user terminals 240 only go to public target servers when needed. The private target servers perform most of the tasks.

Figure 6:
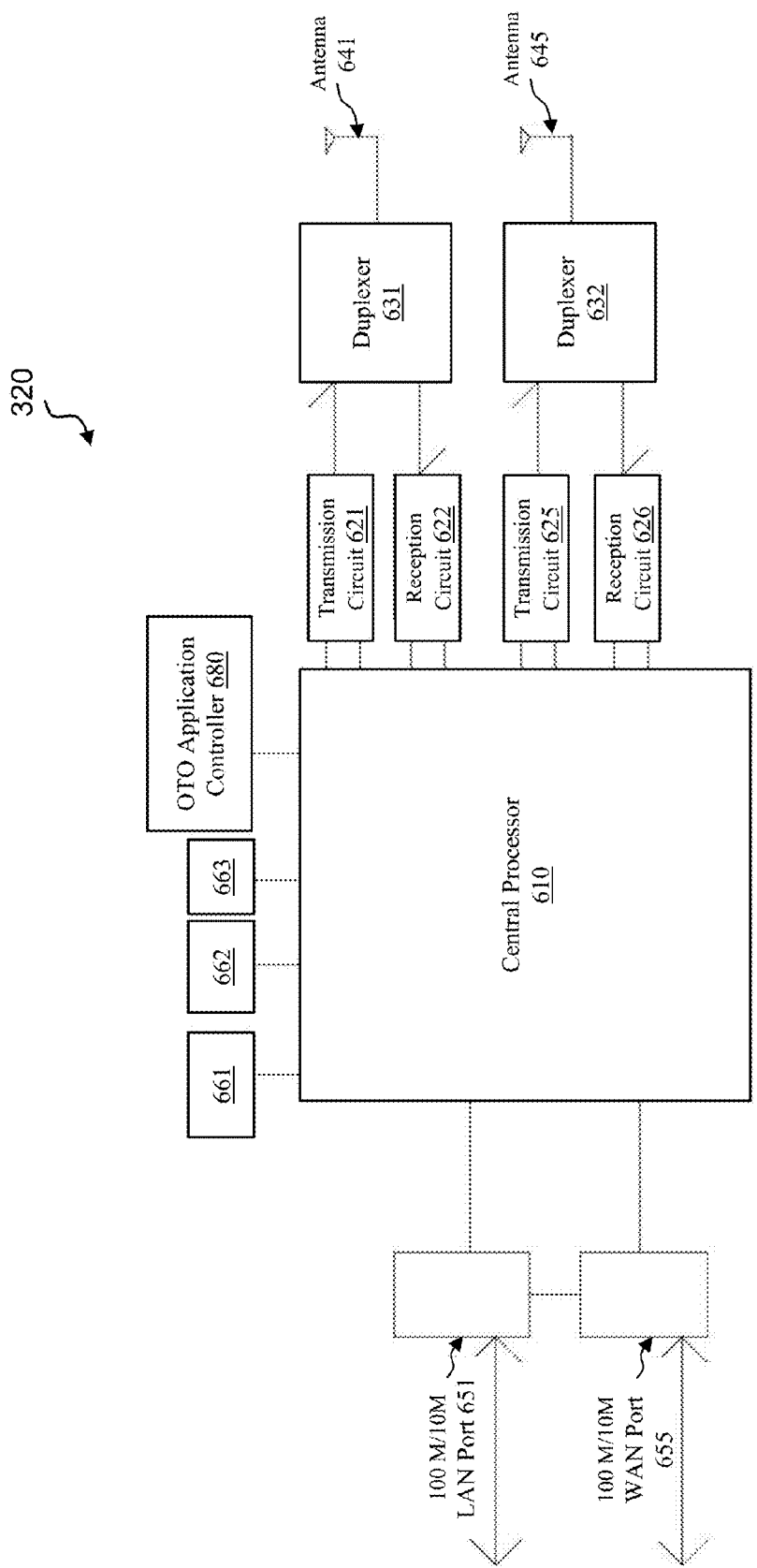
FIG. 6 shows a detailed system block diagram of an OTO access-point router in the computer network system in FIG. 5.

An exemplified detailed system block diagram of the OTO access-point router 520 is shown in FIG. 6. The OTO access-point router 520 performs the functions of a router but also includes the functions of a wireless access-point. The OTO access-point router 520 can include a central processor 410 that can perform processing tasks in a wireless router such as coding, decoding, and processing signals, and controlling other components in the OTO access-point router 520. The central processor 610 can output to and receive data from one or more transmission and reception circuits in for different wireless frequency bands (e.g. 2.4 GHz and 5 GHz). The central processor 610 can wirelessly communicate with the user terminal 240, the data-tag server 220, and the target servers 250 (FIG. 3). For example, in a first band, a transmission circuit 621 and a reception circuit 622 can be switched by a duplexer 631 to transmit or receive signals to or from an antenna 641. The transmission circuit 621 includes a power amplifier and a circuit for converting a data signal to an RF signal to be transmitted by the antenna 641. The reception circuit 622 includes a linear amplifier and a circuit for converting an RF signals received from the antenna 641 to a data signal. Portions of the transmission circuit 621 and the reception circuit 622 can be combined in a transceiver circuit. Similarly, in another band, a transmission circuit 625 and a reception circuit 626 can be switched by a duplexer 632 to transmit or receive signals to or from with an antenna 645. The wireless signals received by the antenna 641, 645 can include data tag information decoded from data tags. The central processor 610 can extract, from the data tag information, service and function information related to an application service as well as information about target servers to conduct tasks to fulfill the business application.

The central processor 610 can be connected to one or more wired communication ports such as a LAN (local area network) port 651 and a WAN (wide area network) port 655, to communicate with the data-tag server 220 and the target servers 250 (FIG. 5). The central processor 610 can also be connected with an oscillator 661, a memory 662, and a device description repository 663. The device description repository 663 stores a list of registered user terminals which are authorized to receiving OTO services. Once contacts are set up with these user terminals, the requests for service and function information and interactions with target servers can proceed without the need for authorization and log-in every time.

The OTO access-point router 520 also includes an OTO application controller 680 in communication with the central processor 610. The OTO application controller 680 stores information essential for fulfilling OTO services using data tags, which includes a product serial number (S/N) that uniquely identifies the OTO access-point router 520. The OTO application controller 680 can also store an OTO service activation ID. The product S/N and the OTO service activation ID are encrypted to avoid being tampered. The OTO application controller 680 can store terms for a leasing management (the time period and types of OTO services that are authorized on the router, etc.) consistent with the agreement stored in the database 223. The OTO application controller 680 can manage the transmission of content from the data tag server 220 and the target servers 250. The OTO application controller 680 can also take data inquiries from the user terminal 240 or from the data tag server 220 or the target servers 250 and conduct data analyses. In another example, the OTO application controller 680 can also manage advertisement, promotion, and product or service announcements sent from target servers to the user terminals. The OTO application controller 680 can also direct user terminals to private target servers 250 (as described above) if the user terminals are on the list of preapproved users.

In some embodiments, the OTO access-point router 520 can also perform some of the above described functions of the data-tag servers 220 (FIGS. 2 and 5). After a data tag is acquired and decoded by the user terminal 240, the decoded information is sent to the OTO access-point router 520. The OTO application controller 680 can extract service and function information related to an application service from the decoded data-tag information. The OTO application controller 680 can also extract information about a group of target servers that are set up to fulfill the application service. In this distributed approach, the OTO access-point router 520 is regularly (e.g. hourly, daily, etc.) updated by the one or more data-tag servers 220 about available application services, service and function information related to each application service, and information about target servers for fulfilling the application services. Such information are encrypted and securely stored in the OTO application controller 680.

Referring to FIGS. 5 and 6, the OTO access-point router 520 can include a physical data tag attached to its outer surface, or a data tag displayed in an electronic display panel. The soft electronic data tag displayed in a display panel on the OTO access-point router 520 is based on the data (product S/N, activation ID, etc.) stored in the OTO application controller 680. The data tag is encoded with the router's product serial number and the OTO service activation ID. The data tag can also be stored and encoded in an RFID (radio frequency identification) tag or NFC (near field communication) tag, which can be read by a respective RFID or NFC sensor in the user terminal 140. In some embodiments, the data in the electronic data tags can be controlled and varied by the OTO application controller 680.

This data tag can be originally issued by the one or more data servers 220 operated by the OTO service provider, and labeled on or stored in the OTO access-point router 520 during the router's manufacturing process. To set up the OTO access-point router 520 for OTO service, the person that installs the OTO access-point router 520 uses a user terminal 240 such as a smart phone to scan the data tag displayed on the OTO access-point router 520. The tag data analysis module in the user terminal 240 parses the tag data to obtain the product serial number and the OTO service activation ID. After proper authentication and log-in, the user terminal 240 can send the acquired information to the one or more data tag servers 220 operated by the OTO service provider, which activates the specific OTO access-point router 520 (based on its product S/N) to enable the fulfillment of OTO services based on data tags.

Once activated, the product S/N of the OTO access-point router 520 is tied to the router owner's user ID (UID), and stored in the database 223 operated by the OTO application service provider. The data tag server 220 assigns an association index, also stored in the database 223, which associates the router's product S/N and the owner's UID at the OTO service provider. The association index is subsequently sent to the user terminal 240.

The OTO application services of the OTO access-point router 520 are defined and governed by an OTO application agreement stored in the database 223. For example, the agreement can define the terms under which the OTO access-point router 520 is leased to a user.

Once set-up, the OTO access-point router 520 can facilitate fulfilling OTO services for user terminals 240. As described above, a user terminal 240 (which may be different from the user terminal used to activate the OTO access-point router) can be a smart phone or a tablet computer equipped with a camera, handheld scanner, and RFID sensing device. The user terminal 240 can include a tag data acquisition module, a tag data analysis module, and an interaction control module. The tag data acquisition module is configured to acquire data from data tags and store the data. The tag data analysis module parses the tag data to obtain a set of data corresponding to services and functions for a business application. The interaction control module exchanges service and function information with corresponding target servers 250, to accomplish appropriate services and/or functions, and to complete the business application. The one or more data-tag servers 220 can provide tag data according to the services as well as service and function information, corresponding to respective target servers 250. In some embodiments, at least part of data tag decoding tasks is conducted by the data-tag server 220.

Similar to above described in relation to FIGS. 2-4, the OTO access-point router 520 communicate with user terminals that scan application tags, action tags, and help track, manage, and update task tags. In some embodiments, application, action, and task data tags can store identification of other application, action, and task data tags instead of the content of the other application, action, and task data tags. The OTO access-point router 520 can store service and function information for applications and information about target servers that are to fulfill the tasks in the applications. The OTO access-point router 520 can also store user and recipient information in an action or action data tag, status of tasks in an action, and etc. The OTO access-point router 520 can also store relationship between applications, actions, and tasks including secondary applications. The OTO access-point router 520 can synchronize the stored information with the OTO service platform 225 (e.g. the database 223).

The user terminal 240 can be a wired or a wireless terminal that can communicate with the data-tag server 220 via the OTO access-point router 520 in a wired and wireless computer network. The database 223 can store a list of application services and corresponding service and function information, and information about target servers 250 associated with the service and function information. The target server information includes API, parameters, and protocol about the associated target servers 250. Using the information obtained from the data tag, the user terminal 240 can communicate with the target servers 250 via the OTO access-point router 520, to request the target servers 250 to fulfill various tasks specified in the service and function information in order to fulfill the business application.

The service information and function information can include product information, location information, logistics information, shopping mode selection, and order and payment information. In some embodiments, the service and function information include SDK 1, SDK 2 . . . , SDK n, which can include service Software SDKs and function SDKs corresponding to the services or functions. The service SDK and the function SDK respectively specify information about their respective target servers 250, such as application programming interface (API), parameters, and protocol associated with the target servers 250.

In some embodiments, the user terminal 240 further includes a selection control module operated by a user and configured to select some or all in the set of the service and function information. In some embodiments, the user terminal 240 further includes a sequence control module configured to determine the order (i.e. sequential parallel) of the selected service and function information to exchange with target servers.

By realizing OTO service definitions, integration, and collaboration, the disclosed system and methods transformed how services are organized and provided, can achieve real-time services by collaboration across organizations, and enable flexible combination of services, refinement of service units, and automated service coordination.

FIG. 6 illustrates some exemplified functions of the OTO access-point router 520, the user terminal 240, and OTO services that can be fulfilled by the computer network system 500 (FIGS. 5 and 6). The user terminal allows a user to register OTO service at an OTO service provider, and log into such a service. The user terminal 240 displays relevant OTO service information received from the data-tag server 220, the target servers 250, and the OTO access-point router 520.

As described above, the OTO access-point router 520 stores information needed to activate OTO service of the OTO access-point router 520 such as produce S/N and OTO activation ID. If applicable, the OTO access-point router 520 can also store information about equipment leasing.

The OTO access-point router 520 can manage the transmission of content from the data tag server 220 and the target servers 250. In Example 2 above, the OTO access-point router 520 can control the type and the rates of content (e.g. including customized news, movies, TV shows, and advertisements) being delivered to the TV set-top boxes and TV.

The OTO access-point router 520 can also take data inquiries from the user terminal 240 or from the data tag server 220 or the target servers 250 and conduct data analyses. In Example 1 above, the OTO access-point router 520 can record the types of products the user is interested, the times and frequencies of the product ordering, and the location of the user terminal 240. In Example 2 above, the OTO access-point router 520 can collect user's TV watching patterns. Relevant information can be reported to target servers 250 so their services can be improved.

In some embodiments, as described above, the OTO application controller 680 in the OTO access-point router 520 can store information about available application services, service and function information related to each application service, and information about target servers for fulfilling the application services. Such information is regularly (e.g. hourly, daily, etc.) updated by the one or more data-tag servers 220, which is encrypted and securely stored in the OTO application controller 680. When a data tag is acquired by a user terminal, the central processor 610 in the OTO access-point router 520 can extract service and function information related to an application service from the data tag, and information about target servers for fulfilling the application service, without having it performed at a remote data-tag server. The OTO access-point router 520 can send the service and function information related to an application service to the user terminal 240 via the transmission circuits 621 or 625 and their reception antenna 631, 632.

Figure 7:
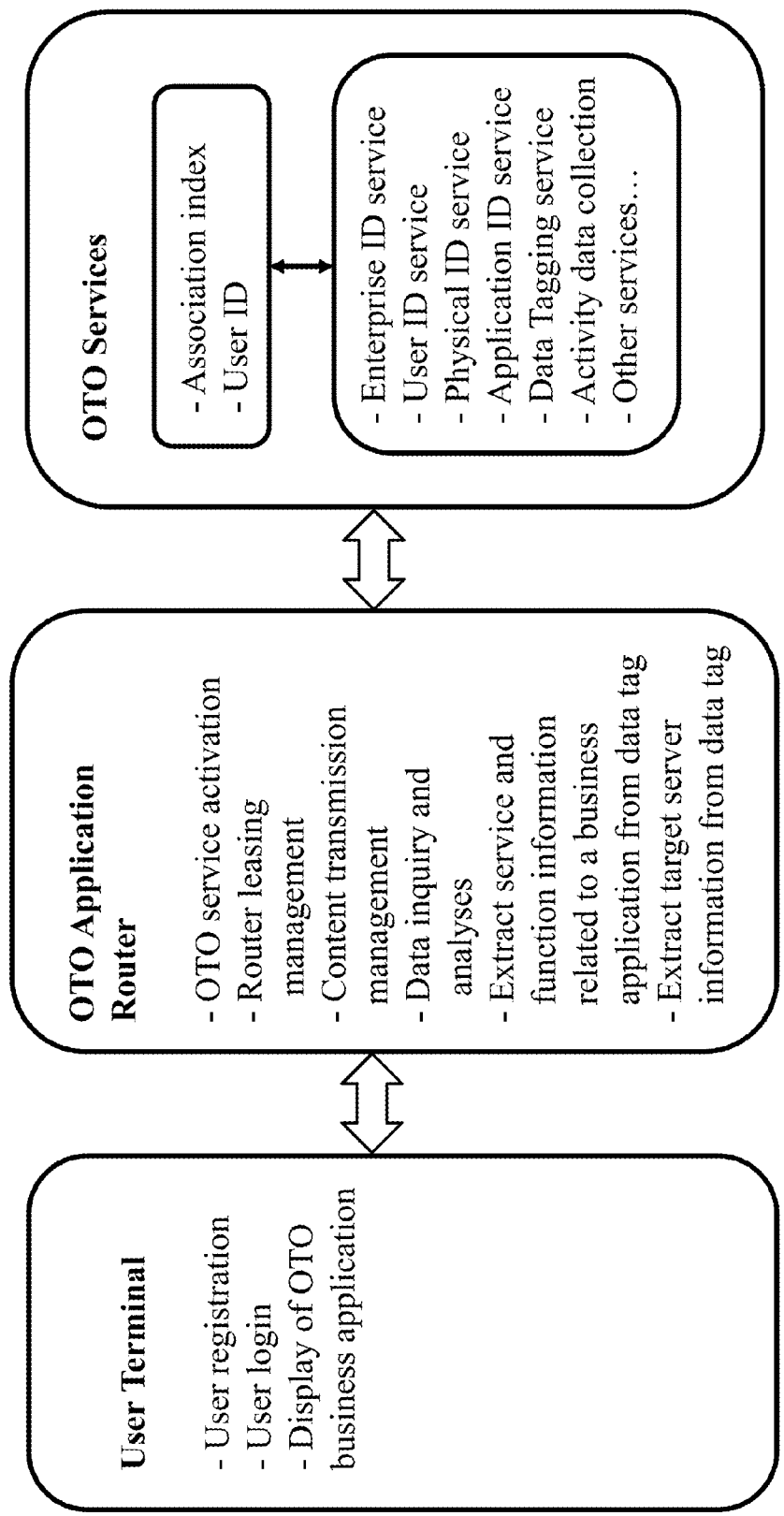
FIG. 7 illustrates exemplified functions of the OTO access-point router, the user terminal, the one or more data-tag servers, and the target servers in the computer network system in FIG. 6.

Still referring to FIG. 7, OTO services that can be fulfilled by the OTO access-point router 520, the one or more data-tag servers 220 and the target servers 250 include producing an association index, producing or linking to a user ID, issuing data tags, activity data collection, and providing services for enterprise IDs, physical IDs, and application IDs.

Figure 8:
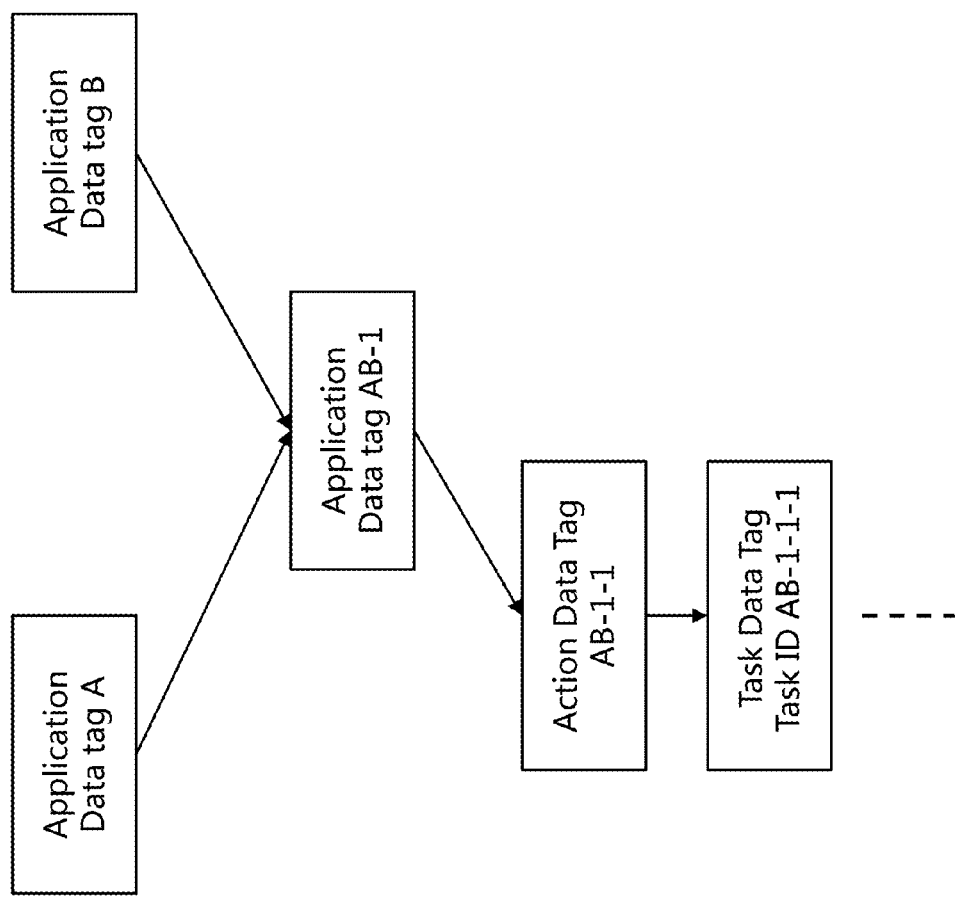
FIG. 8 illustrates the creation of secondary applications using nested task data tags to expanding applications and services.

As described above, the presently disclosed OTO service platform (FIGS. 2 and 5) can support a plurality of applications (such as commercial, government, or non-profit organization applications). In some embodiments, the OTO service platform allows a participant to generate a secondary application based on original applications. Referring to FIG. 8, a participant can use a user terminal to scan an application data tag A and an application data tag B which are based on separate applications. Information in the two application data tags is extracted by the user terminal. The participant can send request to the OTO service platform to initiate a new application based on the two existing applications A and B. The OTO service platform establishes the new application and issues a new application data tag AB-1. The application data tag AB-1 can be scanned by other participant to start new action AB-1-1 with associated data tag AB-1-1 issued by the data tag server in the OTO service platform. The action AB-1-1 can include tasks AB-1-1-1, etc. which can be tracked by their respective task data tags.

As previously described, application, action, and task data tags can embed the content or IDs of the data tags of their base applications or actions. The nested data tags uniquely define relationships between tasks, actions, and original and secondary applications.

It should be noted that application AB-1 is different from action AB-1 in that action AB-1 is created by a participant who ordered a service himself or herself, whereas application AB-1 is a new (commercial) application that is created by an entrepreneur to provide services for others.

As an example, application A is for selling a blouse. Application B is for selling a skirt. A creative participant creates a fashion set that puts the blouse and the skirt together (which match in colors and styles). The participant initiates a new application AB-1 based on the original applications A and B to sell the set of blouse and skirt. Thus the secondary applications encourage entrepreneurship and can significantly expand and scale up commercial activities.

One distinct advantage of the presently disclosed systems and methods that they support complex applications and activities, and allow features to be added and expanded from existing applications. Thus large and complex applications can be broken down to simple applications and tasks, which can be independently available to users.

Figure 9:
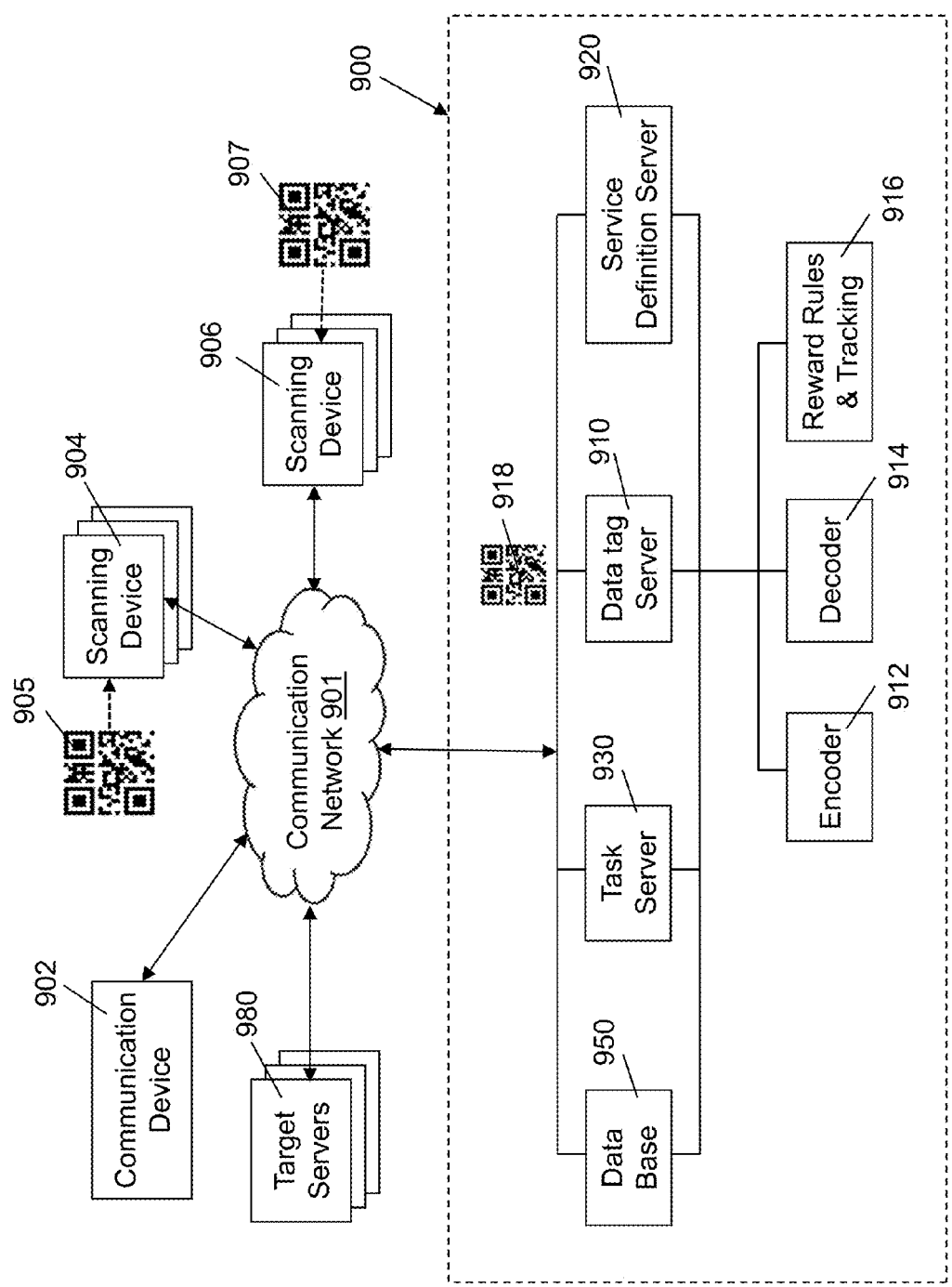
FIG. 9 is a block diagram for a network-based OTO service system in accordance with some embodiments of the present invention.

Reward Data Tags for Managing Tasks and Tracking Rewards in Providing OTO Services In some embodiments, the presently disclosed system and method is particularly suitable for enabling crowd rewarding for proving OTO services with details described below. Referring to FIG. 9, a network-based OTO service system 900 can encourage and enable applications by tracking contributions by different parties using data tags, and clearly defining rewards and properly implementing rewards to all the contributors in the fulfillment process. The network-based OTO service system 900 can be provided or owned by an OTO service provider.

The network-based OTO service system 900 includes a data-tag server 910 for generating and issuing an original reward data tag 918 and for analyzing data obtained from reward data tags 905, 907, 918, a service definition server 920, and a task server 930. The data tags can exist in different forms such as a one-dimensional code, a two-dimensional code, a two-dimensional barcode, a data matrix code, a QR code, or a three-dimensional code, etc. The data tags can also be electronic media or printed media. The data-tag server 910 is in connection with an encoder 912, a decoder 914, and a storage 916 configured to store reward rules.

The network-based OTO service system 900 also includes a data base 950 in communication with the data-tag server 910, the service definition server 920, and the task server 930. Similar to what's discussed above in relation to FIGS. 2 and 5 (the task server 227), the task server 930 manages and tracks tasks according to a timeline for each unique action or activity between an initiator and a participant.

The data base 950 can store information about different contributors in the whole application process as well as identifications of initiators, participants, and service recipients, and status for each unique activity based on an application. As described below, these contributors can include: a reward host who defines a service or product in an application as well as reward rules for different parties involved in fulfilling the application: for example, the discount for a customer who conducts an order of the service and product defined in the application, the percentage(s) of the reward(s) for the one or more reward guest(s) who helped to distribute the data tags in the right channels or in the right group of potential users, the percentage of reward for the reward host, the payoff to the fulfillers of the products and services.

The database 950 also stores characteristics for each application (SDK, target servers, service and function, etc.), product or service IDs, information about third party service providers, and identification and other information about OTO access-point router.

The products and services are fulfilled in part with the support of target servers 980. The target servers 980 can be operated by third parties and in communication with the target servers 980 via a communication network 901. The target servers 980 can be provided by the same OTO service provider as a part of the network-based OTO service system 900.

The network-based OTO service system 900 can be in communication, via the communication network 901, with communication devices 902 operated by reward hosts, scanning devices 904 operated by reward guests, and scanning devices 906 operated by users. The communication network 901 can include wired and wireless networks, or a combination of both. The network-based OTO service system 900 or the communication network 901 can also include OTO access-point router (similar to 520 in FIG. 5 as described above) which communicate with the data tag server 910, the task sever 930, and target servers 980. The scanning devices 904, 906 can be equipped with an image capture device, RFID reader, a Bluetooth sensor, or other sensing devices. The scanning devices 904, 906 can also be installed with a software application configured to scan and decode a reward data tag 905 or 907. The scanning devices 904, 906 can be implemented in various forms such as the user terminal (240 in FIGS. 2 and 5) as described above.

The data-tag server 220 can produce and issue original reward data tags 918 by working with the encoder 912 and using information stored in the storage 916 and the data base 950. The encoder 912 can encode, into original reward data tags 918, service and product information, information about the target servers 980 for fulfilling the products and services, and reward rules associated with the products and services. The target server information can include API, parameters, and protocol about the associated target servers 980.

The data-tag server 220 can then distribute the original reward data tags 918 as distributed original reward data tags 905 over the communication network 901 to scanning devices 904. After a scanning device 904 scans a distributed reward data tag 905, or a scanning device 906 scans a secondary reward data tag 907, the data tag can be decoded by software on the respective scanning device, or by sharing the scanned image with the network-based OTO service system 900 and then decoded by the decoder 914. In some embodiments, at least part of data tag decoding tasks is conducted by the decoder 914. In distribution, the distributed original reward data tag 905 or the secondary reward data tag 907 can exist in the form of electronic media or printed media.

After a distributed original reward data tag 905 is scanned by a scanning device 904 and related information received by the data tag server 910, the data tag server 910 confirms the role of the reward guest that operates the scanning device 904. The identity of the reward guest and the specific product and service that the reward guest may be a potential contributor help to distribute the reward data tag are stored in the storage 916.

In some embodiments, a secondary reward data tag 907 is produced by the data tag server 910 (or optionally by a software application on the first scanning device 904 provided by the network-based OTO service system 900). The secondary reward data tag 907 includes the product and service information as well as the reward rules defined in the original reward data tag 918, and in addition, information about the specific reward guest that is to help distribute the secondary reward data tag 907 to users. Thus the secondary reward data tag 907 can be a vehicle that tracks different contributors to the fulfillment of the associated application.

After the secondary reward data tag 907 is scanned by a scanning device 906 and related information received by the data tag server 910, the data tag server 910 confirms the user that operates the scanning device 906 to be the purchaser of the product and service defined in the secondary reward data tag 907. The identity of the user is stored in the storage 916. The data tag server 910 looks up target server information encoded in the secondary reward data tag 907 and communicates with the task server 930. The task server 930 contacts the relevant target servers 980, and facilitates, manages, and tracks tasks to fulfill the particular service or product for the user as defined in the secondary reward data tag 907.

In some embodiments, the scanning device 906 further includes a selection control module operated by a user and configured to select some or all in the services and products defined in the secondary reward data tag 907. The scanning device 906 can also include a sequence control module configured to determine the order (i.e. sequential parallel) of the selected service and product to exchange with target servers 980. The task server 980 tracks which user has distributed the secondary reward data tag 907 to the user's scanning device 906 so that reward can be properly distributed to all contributing parties.

As described above, the secondary reward data tag 907 (as well as the original reward data tag 918 or the distributed original reward data tag 905) can be encoded with reward rules as defined by the reward host (typically the initiator of the product and service). The task server 930 takes into account of the reward rules when it manages the tasks for this application. For example, the purchase charge to the user may receive a discount if it is defined in the reward rule. After the product or service is fulfilled and the payment is received from the user, the task server 930 can distribute the funds based on the reward rules defined in the reward data tag. The recipients of the rewards can include the fulfillers of the products and services, the reward guests for their contributions to distributions of the data tags, and the reward hosts for their creation of the products and service.

The fulfillment of the product and/or service in the application can utilize action data tag and task data tags, as described in FIGS. 2-4, 8 above. Content in these data tags can be combined and incorporated into the reward data tags 905, 907, and 918 shown in FIG. 9. Moreover, distribution of the reward data tags and the fulfillment of the product and services can also involve OTO access-point router(s), as shown in FIGS. 5-7, in conjunction with data tag, task, and target other servers.

The data tags that are encoded product and service information as well as reward rules, that is, reward data tags, can make applications and implementations of products and services significantly more effective and convenient. In one aspect, the reward data tags mobilize the crowd to distribute and utilize products and services by establishing proper and fair incentives for all contributors. In another aspect, the reward data tags can help to track real contributions by all parties in the fulfillment of a particular product and service, and provides mechanism to reward the parties based on their real contributions. Moreover, the disclosed methods and systems enable the mingling of the roles of consumers and distributors. A user can purchase a product or service as well as can share information about the product and service to others. Furthermore, the disclosed reward system can be seamlessly implemented with the predefined architecture and logic rules at the network-based OTO service system and with little time spent by the reward host, reward guests, and the users.

Figure 10:
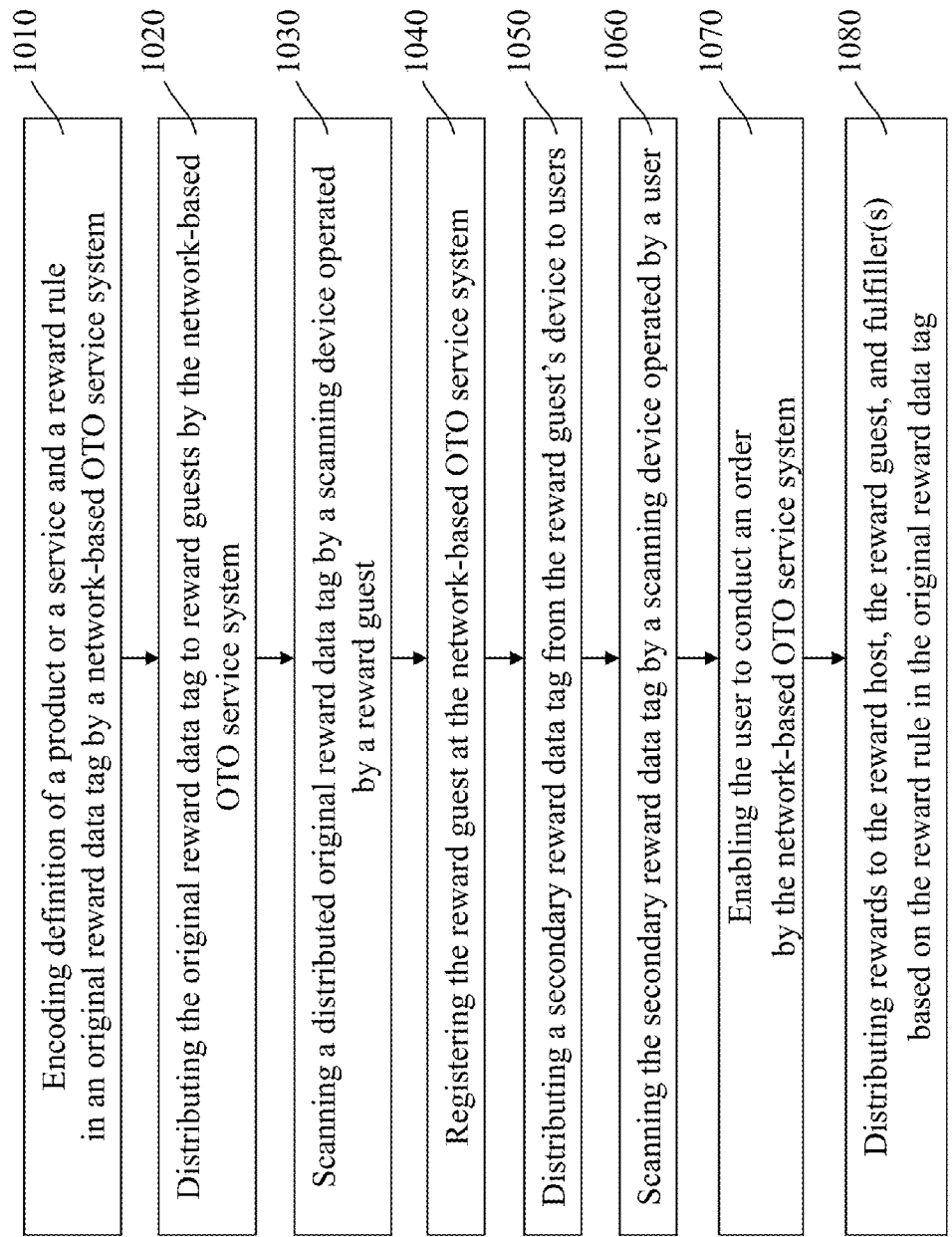
FIG. 10 is a flow diagram for providing OTO services by using reward data-tags.

Referring to FIGS. 9 and 10, a reward host defines a product or a service and reward rules for the product and service, and sends the related information to the network-based OTO service system. Information about the product and the service, as well as the reward rules are encoded in an original reward data tag by an encoder and a data tag server in the network-based OTO service system (step 1010). For example, an exemplified reward rule can allocate 50% of the financial benefit to the reward host and 50% to be shared by all the reward guests who helped to distribute the reward data tags that are finally used by users. The original reward data tag is then distributed to reward guests by a task server in the network-based OTO service system (step 1020). A reward guest uses a scanning device to scan the distributed original reward data tag (step 1030). In other words, the reward associated with the product or service is "responded" by the reward guest. The scanning device decodes and extracts the product or the service and reward rules in the distributed original reward data tag, and display such information on the first scanning device. The reward guest then confirms that he or she agrees to the reward rules and the confirmation is sent from the scanning device to the data tag server. The in the network-based OTO service system, which registers the reward guest (step 1040) as a potential distributor and advocate for the product and service encoded in the data tag. Information about the reward guest is stored in the data base 950 and optionally also in the storage 916.

The reward guest can then command to distribute a secondary reward data tag to users (step 1050), which can be initiated from the scanning device through the network-based OTO service system. Since the secondary reward data tag contains all the information (product and service, reward, target server information, task server location and protocols, etc.), the secondary reward data tag can be distributed from the reward guest's other devices and in many other channels. Moreover, as described above, the secondary reward data tag can further be encoded with information about the reward guest for properly tracking contributions along the fulfillment process. The second reward data tag can be encoded by the data tag server in the network-based OTO service system or by a software app downloaded on the scanning device from the network-based OTO service system. Accordingly, the secondary reward data tag can be distributed from the data tag server or the first scanning device to the second scanning server.

The secondary reward data tag is then scanned by a scanning device operated by a user (step 1060) who may be interested to learn or purchase the product or service. In other words, the reward associated with the product or service is "responded" by the user. The scanning can take different forms such as taking a picture of a physical barcode, or capturing a digital data tag image. The secondary reward data tag is decoded on the user's scanning device or with the assistance of a decoder at the network-based OTO service system. If the user is interested, the task server in the network-based OTO service system can enable the user to conduct an order (step 1070) for the product or service based on the product or service encoded in the reward data tag. The process can involve multiple tasks such as contacting one or more target servers for fulfilling the product and service, and conduct transactions for the order, etc. Information about the user and process is stored in the data base 950 and optionally also in the storage 916.

After the product or service is fulfilled and the payment is received from the user, the task server can distribute rewards based on the reward rules defined in the reward data tag. The recipients of the rewards can include the fulfiller(s) of the product and service, the reward guest(s) who distributed the reward data tag, and the reward host who created the products and service, and the reward rules (step 1080).

In some embodiments, the reward guests can be also business entities in addition to individuals. For example, a pizza shop can have a scanning device to scan a reward data tag distributed by data tag server 910, and then print the reward data tag on all the pizza boxes used by that pizza shop. The reward data tag may be encoded with products or services such as sales for movie tickets, a café, a hair salon, a flower shop, a drug store, a taxi service, or an ice-cream store, etc. The pizza buyers can scan the printed data tag (2D codes etc.) to obtain information about the products and services and may decide to order them, in ways as described above.

In summary, the reward data tags and the network-based OTO service system can transform how services are organized and provided, and can achieve seamless real-time services by collaboration across organizations and individuals under the fair and right incentives.

In summary, the disclosed data tag systems and methods not only enable complex applications to be easily developed based on existing applications, but also encourage different parties to collaborate to general new opportunities for the business and new services for customers, which results in a much healthy digitally enabled business ecosystem. The disclosed data tag systems and methods can also quantify contributions from different contributors for fulfilling a service, which allows accurate payment to be rewarded to different contributors.

In the present specification, the present invention has been described with specific examples. However, it should be noted that various modifications and variations may be made without departing from the spirit and scope of the invention. Accordingly, the specification and drawings are to be regarded for illustrative rather than restrictive purposes.

What is claimed is:

1. A computer-network based method for providing and rewarding object-to-object (OTO) services, comprising:

encoding definition of a product or a service and reward rules in an original reward data tag by an encoder in a network-based OTO service system;

distributing the original reward data tag to one or more reward guests through a communication network by a data tag server in the network-based OTO service system, wherein the original reward data tag is scanned by a first scanning device operated by the one or more reward guests;

in response to scanning of the original reward data tag by the first scanning device, registering the one or more reward guests by the network-based OTO service system;

distributing a secondary reward data tag to a second scanning device operated by a user to allow the secondary reward data tag to be scanned by the second scanning device, wherein the secondary reward data tag includes at least content in the original reward data tag;

in response to scanning of the secondary reward data tag by the second scanning device, enabling the user to conduct an order of the product or the service by the network-based OTO service system; and distributing rewards associated with the order to a reward host, the one or more reward guests, and a fulfiller based on the reward rules encoded in the original reward data tag.

2. The computer-network based method of claim 1, further comprising:

encoding, in the secondary reward data tag, definition of the product or the service and reward rules, and information about the one or more reward guests.

3. The computer-network based method of claim 1, wherein the step of distributing a secondary reward data tag to a second scanning device is in response to the one or more reward guests.

4. The computer-network based method of claim 3, wherein the secondary reward data tag is distributed to the second scanning device by the data tag server in response to the one or more reward guests.

5. The computer-network based method of claim 3, wherein the secondary reward data tag is distributed from the first scanning device to the second scanning device in response to the one or more reward guests.

6. The computer-network based method of claim 1, further comprising:

managing the order by a task server in the network-based OTO service system based on the product or the service encoded in the original reward data tag; and fulfilling the product or the service by one or more target servers in communication with the task server based on the product or the service encoded in the original reward data tag.

7. The computer-network based method of claim 6, wherein the original reward data tag stores information about the one or more target servers.

8. The computer-network based method of claim 7, wherein the information about the one or more target servers comprises application programming interface (API), parameters, and protocol associated with the one or more target servers.

9. The computer-network based method of claim 1, further comprising:

allowing the product or the service and the reward rules in the original reward data tag to be decoded and extracted by the first scanning device; and receiving a confirmation of agreement to the reward rules from the first scanning device by the data tag server before the step of registering.

10. The computer-network based method of claim 9, further comprising:

storing information about the one or more reward guests in a database or a storage in the network-based OTO service system.

11. The computer network system of claim 1, wherein the step of registering the one or more reward guests comprises registering the one or more reward guests as a potential contributor to distribute the secondary reward data tag to users.

12. The computer network system of claim 1, wherein the original reward data tag comprises a one-dimensional code, a two-dimensional code, a two-dimensional barcode, a data matrix code, a QR code, or a three-dimensional code.

13. The computer network system of claim 1, wherein the secondary reward data tag is in a form of electronic media or printed media.

* * * * *